Dec. 31, 1968     V. H. STROBUSH     3,419,307
FRONT SEAT BACK LOCK AND ADJUSTING MEANS
Filed Oct. 19, 1967     Sheet 1 of 2

INVENTOR.
Victor H. Strobush
BY
E. J. Biskup
ATTORNEY

Dec. 31, 1968

V. H. STROBUSH 3,419,307

FRONT SEAT BACK LOCK AND ADJUSTING MEANS

Filed Oct. 19, 1967

INVENTOR.
Victor H. Strobush
BY
E. J. Biskup
ATTORNEY

United States Patent Office 3,419,307
Patented Dec. 31, 1968

3,419,307
FRONT SEAT BACK LOCK AND ADJUSTING MEANS
Victor H. Strobush, St. Louis Park, Minn., assignor to General Motors Corporation, Detroit, Mich., a corporation of Delaware
Filed Oct. 19, 1967, Ser. No. 676,469
5 Claims. (Cl. 297—379)

ABSTRACT OF THE DISCLOSURE

A locking device for holding a foldable seat back in an upright position characterized in that the device includes an elongated rod having the lower end thereof supported by the seating portion for pivotal movement about a transverse axis. Support means are fixed with the seat back for telescopingly receiving the upper end of the rod and a latch is pivotally connected to the seat back and normally biased into engagement with the rod. A notch formed in the rod is adapted to accommodate the latch and thereby hold the seat back in an upright position.

---

The present invention relates to a vehicle seat and more particularly to a seat having a foldable or tiltable seat back that is disengagingly secured in an upright position against the possibility of unintentionable forward folding movement. According to one feature of the present invention the locking device for restraining movement of the seat back includes a telescoping connection, one part of which is secured to the seating portion of the seat while the other part is incorporated within the seat back. A latch is provided on the seat back for automatically preventing relative movement between the telescoping parts to thereby lock the seat back when the latter is in the upright position. Another feature of this invention is the provision of means for adjusting the position of one of the telescoping parts relative to its support structure so that the upright position of the seat back can be varied between fixed limits when desired.

Other features and advantages of the present invention will be more apparent from the following detailed description when taken with the drawings in which.

Figure 1:
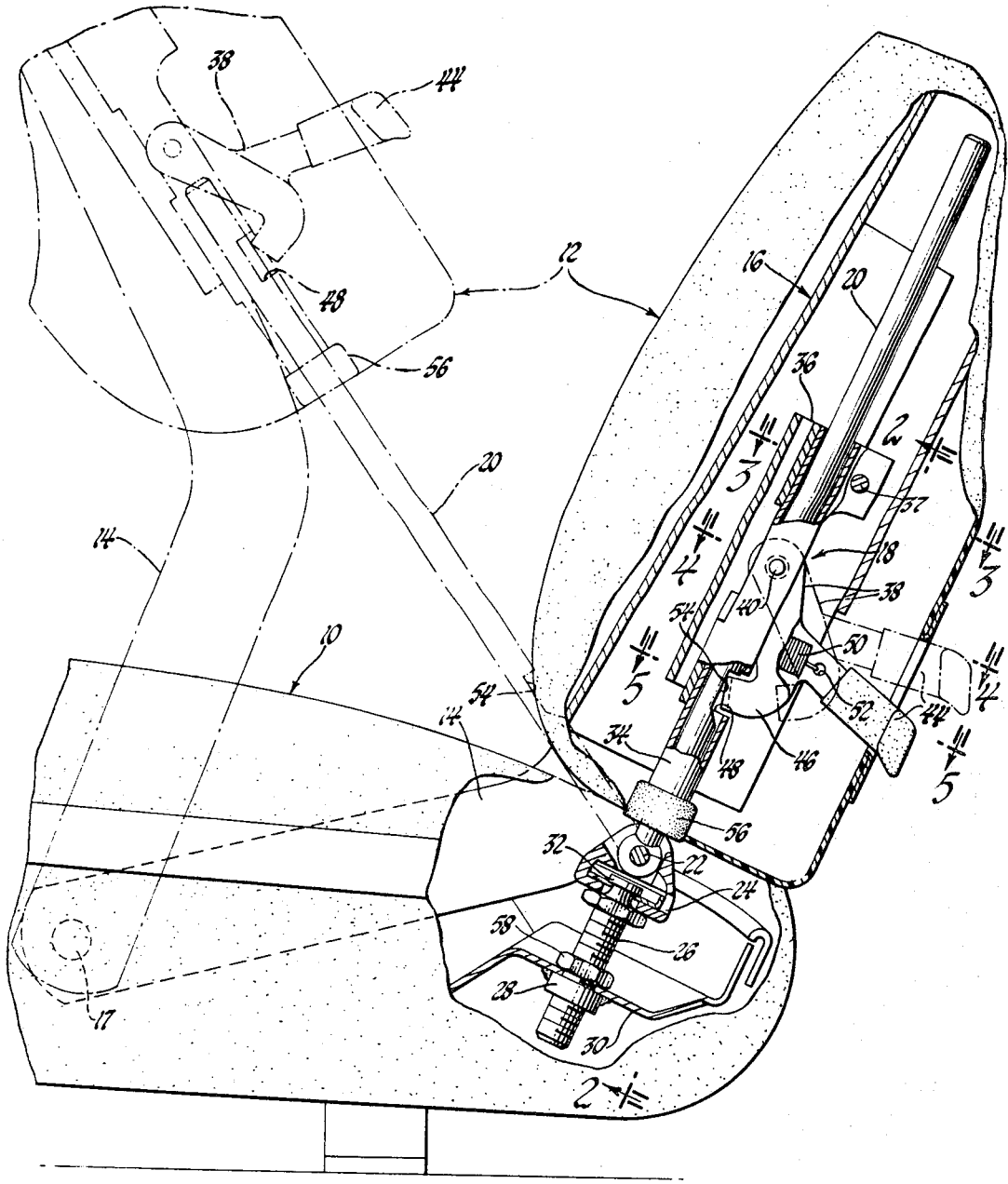
FIGURE 1 is a fragmentary elevation view showing a seat assembly provided with a locking device made in accordance with the invention.

Referring to the drawings and more particularly FIGURE 1 thereof, a vehicle seat is shown comprising a seating portion 10 and a seat back portion 12, the latter of which is hingedly connected to the seating portion 10 by an L-shaped arm 14, the upper end (not shown) of which is rigidly fixed with the frame 16 of the seat back portion 12. The lower end of the arm 14 extends forwardly for pivotal connection with the seating portion at a point 17. It will be understood that a similar arm is located on the opposite side of the seat so that the seat back portion 12 is adapted to pivot forward and over the seating portion, as shown in phantom lines, about a transverse horizontal axis passing through the point 17.

A seat locking device made in accordance with the invention and generally indicated by the numeral 18 is incorporated with the seat, and is adapted to maintain the seat back 12 in an upright or seat-forming position as indicated in full lines in FIGURE 1. The locking device 18 comprises an elongated rod 20, the lower end of which is pivotally connected by a pin 22 to a yoke 24 which, in turn, is held in position by an anchor bolt 26 threaded within a nut 28 which is fixedly secured to the frame 30 of the seating portion 10. The head 32 of the anchor bolt 26 is restrained from axial movement with respect to the yoke 24, however, it is permitted to rotate about the axis of the bolt for reasons which will be more fully explained hereinafter.

Figure 2:
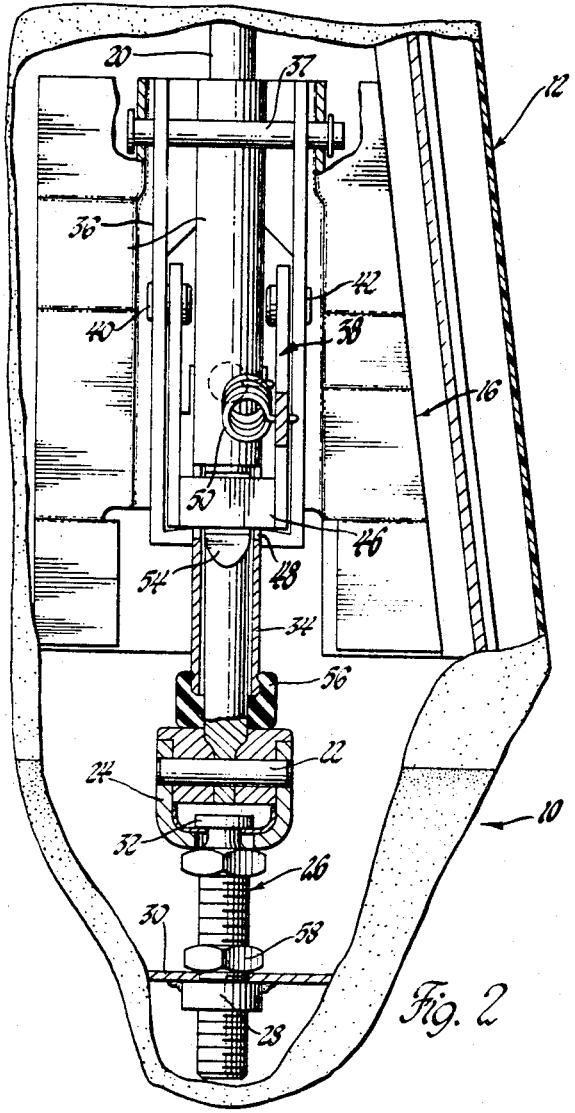
FIGURE 2 is an enlarged view partly in section taken on line 2—2 of FIGURE 1 and showing the locking device of FIGURE 1 when viewed from the rear.
Figure 3:
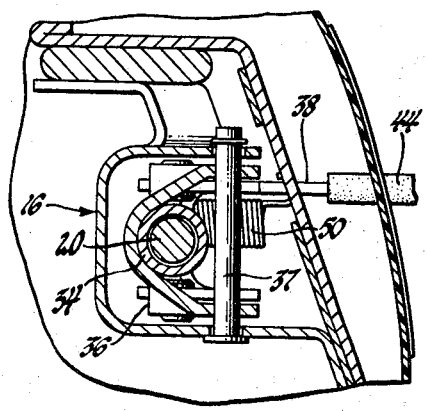
FIGURE 3 is an enlarged sectional view taken on line 3—3 of FIGURE 1.
Figure 4:
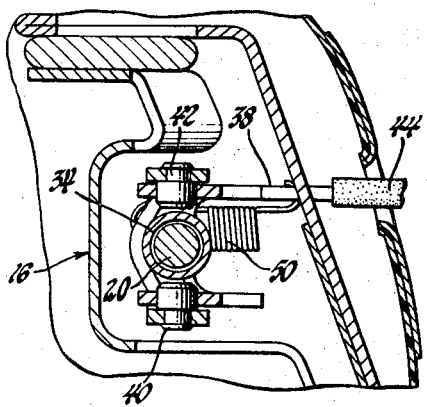
FIGURE 4 is an enlarged sectional view taken on line 4—4 of FIGURE 1.
Figure 5:
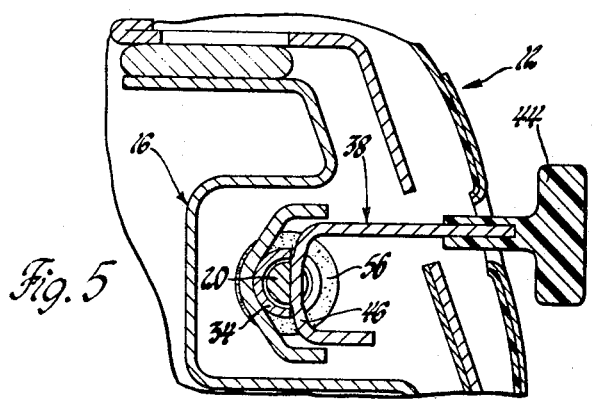
FIGURE 5 is an enlarged sectional view taken on line 5—5 of FIGURE 1.

The upper end of the rod 20 is normally located within the seat back 12 and is received within a sleeve member 34 fixed to a support plate 36 that is pivotally secured to the frame 16 of the seat back 12 by a pin 37. As best seen in FIGURES 1, 2 and 3, a latch member 38 is pivotally supported on the support plate 36 by a pair of transversely spaced pins 40 and 42. The latch member 38 includes an operating handle 44 which extends rearwardly and is located to the rear of the seat back 12 so it is accessible for movement between the full line and phantom line positions indicated in FIGURE 1. A forwardly extending catch 46 is formed with the latch member 38 and is adapted to move through an opening 48 formed in the sleeve member 34 under the influence of a coil spring 50, one end of which is held within an aperture 52 in the latch member 38 while the other end is attached to the support plate 36. The rod 20 has a notch 54 formed therein which, in the upright or seat-forming position of the seat back 12, is adapted to receive the catch 46 of the latch member 38 and thereby lock the seat back 12 in position. FIGURES 1 and 5 show the catch 46 located within the notch 54.

In operation, when it is desired to move the seat back 12 to the forward position of FIGURE 1, the handle 44 of the latch member 38 is raised, as mentioned before, thereby disengaging the catch 46 from the notch 54. Thereafter, the seat back 12 is tilted forwardly about its hinge connection with the seating portion 10 at which time the rod 20 moves out of the sleeve 34 and the catch 46 simply bears on the cylindrical outer surface of the rod 20 due to the biasing force of the spring 50. Stop means in the form of an enlarged head can be located on the upper end of the rod for limiting the extent of forward movement of the seat back 12 relative to the seating portion. Other forms of stop means can be used as should be apparent to persons skilled in the art for purposes of restraining tilting movement of the seat back. When the seat is returned from the forward position to the seat-forming position, the catch 46 will automatically move into the notch 54 formed in the rod 20 and once again restrain the seat from forward tilting movement. It will be noted that when the seat returns to its normal seat-forming position, a rubber bumper 56 secured to the lower end of the sleeve 34 serves to cushion the return movement by contacting the upper end of the yoke member 24.

One feature of the locking device described above is the ability of the yoke 24 to be raised and lowered so as to permit adjustment of the seat-forming position of the seat back 12. In this connection and as alluded to hereinbefore, the anchor bolt 26 is threadably received by the frame 30 of the seating portion 10. It will also be noted that a nut 58 is screwed on the anchor bolt 26 which may be unthreaded so as to permit rotation of the anchor bolt into or out of the supporting nut 28. This can be accomplished by simply rotating the anchor bolt about its axis with the result that the pivot pin 22 of the rod 20 is raised, this causes the seat back 12 to assume a more vertically orientated position. Lowering of the pivot pin 22 causes the seat back 12 to move rearwardly and assume a more reclining position. Once the desired position of the seat back 12 is obtained, the nut 58 is again tightened against the frame 30 to secure from further rotation the anchor bolt 26.

Various changes and modifications can be made in this construction without departing from the spirit of the invention. Such changes and modifications are contemplated by the inventor and he does not wish to be limited except by the scope of the appended claims.

What is claimed is:

1. In combination with a seat having a seating portion and a seat back portion movable about a first transverse axis between an upright position and a forward position over said seating portion, a locking device for holding said seat back in said upright position, said device comprising an elongated rod having one end thereof supported by the seating portion for pivotal movement about a second transverse axis, support means fixed with said seat back for telescopingly receiving the other end of said rod, a latch pivotally connected to said seat back and normally biased into engagement with said rod, a notch formed in said rod and adapted to accommodate said latch to hold said seat back in said upright position, and adjustment means connected to said one end of said rod for varying the position of said second transverse axis relative to said first transverse axis whereby the upright position of said seat back can be varied between fixed limits.

2. In combination with a seat having a seating portion and a seat back portion movable about a first transverse axis between an upright position and a forward position over said seating portion, a locking device for holding said seat back in said upright position, said device comprising an elongated rod having the lower end thereof supported by the seating portion adjacent the rear thereof for pivotal movement about a second transverse axis horizontally spaced from the first transverse axis, support means fixed within said seat back for telescopingly receiving the upper end of said rod, a manually operable latch pivotally connected to said support means, spring means normally biasing said latch into engagement with said rod, a notch formed in said rod and adapted to accommodate said latch to hold said seat back in said upright position, and adjustment means connected to said lower end of said rod for varying the position of said second transverse axis relative to said first transverse axis whereby the upright position of said seat back can be varied between fixed limits.

3. The combination recited in claim 2 wherein said adjustment means includes an anchor bolt threadably received by the frame of the seating portion.

4. The combination recited in claim 2 wherein said latch has a handle fixed therewith that extends out of the rear of said seat back portion.

5. The combination recited in claim 2 wherein said latch is pivotally supported by said support means about a third axis that is substantially parallel to said first axis.

References Cited

UNITED STATES PATENTS

| | | | |
|---|---|---|---|
| 2,579,305 | 12/1951 | Cushman | 297—361 |
| 2,833,336 | 5/1958 | McGregor | 297—365 |
| 3,028,198 | 4/1962 | Murr | 297—216 |
| 3,123,401 | 3/1964 | Komenda | 297—379 |
| 3,288,527 | 11/1966 | Martens | 297—355 |
| 3,328,077 | 6/1967 | Krasinski | 297—379 |
| 3,339,976 | 9/1967 | Karl | 297—379 |

BOBBIE R. GAY, *Primary Examiner.*

G. O. FINCH, *Assistant Examiner.*